(12) United States Patent
Yamanaka et al.

(10) Patent No.: US 9,645,353 B2
(45) Date of Patent: May 9, 2017

(54) OPTICAL SYSTEM AND IMAGE PICKUP APPARATUS

(71) Applicant: Tamron Co., Ltd., Saitama-shi (JP)

(72) Inventors: Hisayuki Yamanaka, Saitama (JP);
Keisuke Okada, Saitama (JP);
Takahiko Sakai, Saitama (JP); Yoshito Iwasawa, Saitama (JP)

(73) Assignee: Tamron Co., Ltd., Saitama-Shi (JP)

( * ) Notice: Subject to any disclaimer, the term of this patent is extended or adjusted under 35 U.S.C. 154(b) by 0 days.

(21) Appl. No.: 15/050,852

(22) Filed: Feb. 23, 2016

(65) Prior Publication Data

US 2016/0252706 A1    Sep. 1, 2016

(30) Foreign Application Priority Data

Feb. 27, 2015    (JP) .................................. 2015-038267

(51) Int. Cl.
| | | |
|---|---|---|
| *G02B 9/12* | (2006.01) | |
| *G02B 13/04* | (2006.01) | |
| *G02B 9/64* | (2006.01) | |
| *G02B 13/00* | (2006.01) | |
| *G02B 27/64* | (2006.01) | |
| *G02B 27/00* | (2006.01) | |

(52) U.S. Cl.
CPC ............. *G02B 9/64* (2013.01); *G02B 13/005* (2013.01); *G02B 27/646* (2013.01); *G02B 13/006* (2013.01); *G02B 27/0025* (2013.01)

(58) Field of Classification Search
CPC ............................... G02B 9/12; G02B 13/0035
USPC .......................... 359/689, 716, 753, 784, 792
See application file for complete search history.

(56) References Cited

U.S. PATENT DOCUMENTS

| | | | |
|---|---|---|---|
| 5,640,277 A | 6/1997 | Ohshita | |
| 2011/0211267 A1* | 9/2011 | Takato | A61B 1/00188 359/784 |

FOREIGN PATENT DOCUMENTS

JP    H07-199066 A    8/1995

\* cited by examiner

*Primary Examiner* — William Choi
(74) *Attorney, Agent, or Firm* — The Webb Law Firm

(57) ABSTRACT

An optical system of the present invention includes, in order from an object side: a first lens group G1; a second lens group G2 having positive refractive power; and a third lens group G3 having positive refractive power, wherein the first lens group G1 and the third lens group G3 are fixed in an optical axis direction while the second lens group G2 is moved in an optical axis direction to focus on from an object at infinity to an object at a finite distance, and specified conditions is satisfied.

12 Claims, 6 Drawing Sheets

OPTICAL SYSTEM AND IMAGE PICKUP APPARATUS

CROSS-REFERENCE TO RELATED APPLICATION

This application claims priority to Japanese Patent Application No. 2015-038267 filed Feb. 27, 2015, the disclosure of which is hereby incorporated in its entirety by reference.

BACKGROUND OF THE INVENTION

Field of the Invention

The present invention relates to optical systems and image pickup apparatuses. The present invention more particularly relates to an optical system suitable for an image pickup apparatus with use of a solid-state image sensor, such as digital still cameras and digital video cameras, and to an image pickup apparatus including the optical system.

Description of the Related Art

Image pickup apparatuses with use of a solid-state image sensor, such as digital still cameras and digital video cameras, have spread. With recent development of higher-performance, smaller-size, and the like of imaging optical systems, small imaging systems are rapidly spreading in particular.

Such small imaging systems are demanded to have further higher performance and smaller size. In the case of single-focus optical systems in particular, larger-aperture systems are highly demanded. For example, Japanese Patent Application Laid-Open No. 7-199066 discloses a small single-focus optical system with a large-aperture, the system having sufficient close-distance performance and having an F-number smaller than 2.8.

However, in the optical system described in Japanese Patent Application Laid-Open No. 7-199066, chromatic aberration correction is insufficient, and so the performance of the optical system is not high enough.

Accordingly, an object of the present invention is to provide small, high-performance, and large-aperture optical system and image pickup apparatus which are suitable for a small imaging system.

SUMMARY OF THE INVENTION

In order to accomplish the above object, an optical system of the present invention includes, in order from an object side: a first lens group; a second lens group having positive refractive power; and a third lens group having positive refractive power, wherein the first lens group and the third lens group are fixed in an optical axis direction while the second lens group is moved in the optical axis direction to focus on from an object at infinity to an object at a finite distance, and following conditions are satisfied:

$$1.90 < Nd1 \quad (1)$$

$$0 < Cr1f/f \quad (2)$$

In the above expressions, Nd1 represents a refractive index of a lens on a d-line, the lens being closest to the object side in the first lens group, Cr1f represents a radius of curvature of a surface closest to the object side in the first lens group, and f represents a focal length of the entire optical system.

The image pickup apparatus of the present invention includes: an optical system according to the present invention; and an image sensor provided on an image-plane side of the optical system for converting an optical image formed by the optical system into an electrical signal.

According to the present invention, it becomes possible to provide small, high-performance, and large-aperture optical system and image pickup apparatus which are suitable for a small imaging system.

DETAILED DESCRIPTION OF THE PREFERRED EMBODIMENTS

Figure 1:
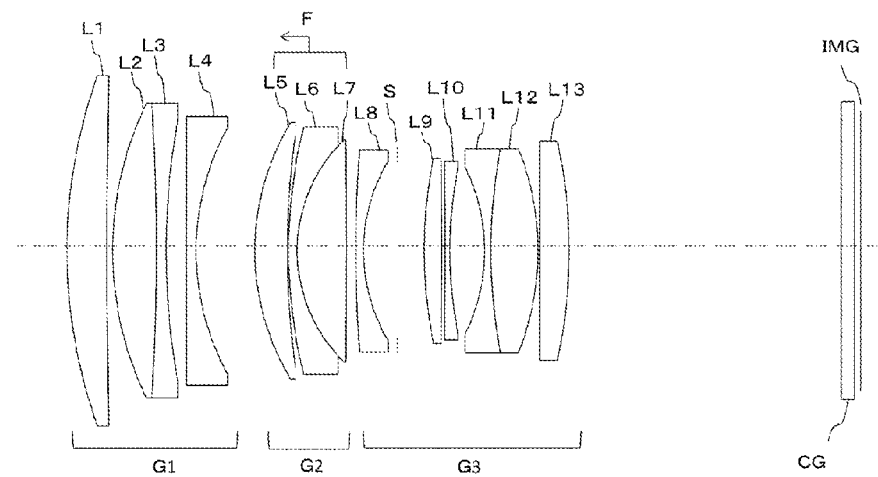
FIG. 1 is a cross sectional view illustrating an example of lens construction in an optical system of Example 1 of the present invention.

Hereinafter, embodiments of an optical system and an image pickup apparatus according to the present invention will be described.

1. Optical System 1-1. Construction of Optical System

An optical system according to the present invention includes, in order from an object side: a first lens group; a second lens group having positive refractive power; and a third lens group having positive refractive power, wherein the first lens group and the third lens group are fixed in an optical axis direction while the second lens group is moved in the optical axis direction to focus on from an object at infinity to an object at a finite distance, and conditions expressed by later-described expression (1) and expression (2) are satisfied. First, the construction of the optical system according to the present invention will be described.

The optical system according to the present invention includes, in order from an object side: a first lens group; a second lens group having positive refractive power; and a third lens group having positive refractive power. Since luminous flux can be collected by the second lens group and the third lens group which are disposed at the image-plane side, the optical system with a larger aperture can be implemented.

In the present invention, the first lens group and the third lens group are fixed in an optical axis direction while the second lens group is moved in the optical axis direction to focus on from an object at infinity to an object at a finite distance. Since only the second lens group, which is part of the lens groups including the first lens group to the third lens group that constitute the optical system, is moved, it becomes possible to achieve reduction in size and weight of a focus group and to achieve reduction in size and weight of the entire optical system including a lens-barrel construction. It also becomes possible to reduce the load for moving the focus group and to achieve execution of quick focusing operation.

Hereinafter, the construction of each lens group will be described.

(1) First Lens Group

Specific details of the lens construction of the first lens group are not particularly limited as long as the later-described expressions (1) and (2) are satisfied. In the present invention, the first lens group may have positive or negative refractive power. The advantages of the present invention can be implemented regardless of whether the refractive power of the first lens group is positive or negative in the present invention. Particulars with respect to the expressions, more preferred lens construction, and the like will be described later. The above description also applies to other lens groups.

(2) Second Lens Group

Specific details of the lens construction of the second lens group are not particularly limited as long as the refractive power of the second lens group is positive. However, the second lens group preferably has at least one lens having negative refractive power. When at least one lens having negative refractive power is disposed in the second lens group having positive refractive power, it becomes possible to suppress variation in chromatic aberration relating to movement of the second lens group at the time of focusing and to thereby provide excellent image formation performance regardless of the distance to a subject.

(3) Third Lens Group

Specific details of the lens construction of the third lens group are not particularly limited as long as the refractive power of the third lens group is positive. However, the third lens group preferably has at least one lens having negative refractive power. When at least one lens having negative refractive power is disposed in the third lens group having positive refractive power, it becomes possible to suppress occurrence of chromatic aberration in the third lens group and to thereby achieve implementation of sufficient image formation performance.

In the third lens group, the surface closest to the image-plane side preferably has a convex shape on the image-plane side. When the final surface in the optical system has a convex shape toward the image-plane side, luminous flux can be collected on the final surface, so that a larger-aperture system can be implemented without increasing the lens diameter of the optical system.

(4) Image Stabilization Group

In the optical system according to the present invention, the entire or part of any one lens group, out of the lens groups including the aforementioned first lens groups to third lens groups, may be moved in a direction perpendicular to the optical axis so as to be used as an image stabilization group for correcting rotation shake and the like resulting from vibration during imaging or from other factors.

1-2. Expressions

A description is now given of the conditions that the optical system according to the present invention should satisfy or may preferably satisfy.

First, the optical system according to the present invention shall satisfy following conditions expressed by expressions (1) and (2):

$$1.90 < Nd1 \tag{1}$$

$$0 < Cr1f/f \tag{2}$$

In the expressions (1) and (2), Nd1 represents a refractive index of a lens on a d-line, the lens being disposed closest to the object side in the first lens group, $Cr1f$ represents a radius of curvature of a surface closest to the object side in the first lens group, and f represents a focal length of the entire optical system.

1-2-1. Expression (1)

The expression (1) above is an expression that defines a refractive index of a lens (material) on a d-line, the lens being disposed closest to the object side in the first lens group. When the expression (1) is satisfied, the refractive index of the lens disposed closest to the object side in the first lens group takes an appropriate value, so that field curvature can sufficiently be corrected. This makes it possible to provide a small and high-performance optical system.

On the contrary, when Nd1 in the expression (1) becomes equal to or below the lower limit, the refractive index of the lens disposed closest to the object side in the first lens group becomes smaller, which is not preferable because it becomes difficult to correct the field curvature.

To achieve the aforementioned advantages of the present invention, it is preferable for the lens disposed closest to the object side in the first lens group to satisfy a following expression (1)', it is more preferable to satisfy an expression (1)'', and it is still more preferable to satisfy an expression (1)''':

$$1.92 < Nd1 \tag{1)'}$$

$$1.94 < Nd1 \tag{1)''}$$

$$1.95 < Nd1 \tag{1)'''}$$

1-2-2. Expression (2)

In the optical system according to the present invention, it is preferable for the surface closest to the object side in the first lens group to satisfy a following condition:

$$0 < Cr1f/f \tag{2}$$

where $Cr1f$ represents a radius of curvature of the surface closest to the object side in the first lens group.

The expression (2) is an expression that defines the radius of curvature of the surface closest to the object side in the first lens group. When the expression (2) is satisfied, the surface closest to the object side in the first lens group has a convex shape toward the object side. Accordingly, it becomes possible to sufficiently correct distortion aberration and field curvature with a small number of lenses. This makes it possible to provide a small and high-performance optical system.

On the contrary, when the expression (2) is not satisfied, the surface closest to the object side in the first lens group is flat or concave toward the object side, which is not preferable since it becomes difficult to correct distortion aberration or field curvature with a small number of lenses is difficult.

To achieve the aforementioned advantages of the present invention, it is preferable for the surface closest to the object side in the first lens group to satisfy a following expression (2)', it is more preferable to satisfy an expression (2)'', it is still more preferable to satisfy an expression (2)''', and it is the most preferable to satisfy an expression (2)'''':

$$0.2 < Cr1f/f < 20.0 \quad (2)'$$

$$0.3 < Cr1f/f < 10.0 \quad (2)''$$

$$0.4 < Cr1f/f < 5.0 \quad (2)'''$$

$$0.5 < Cr1f/f < 3.0 \quad (2)''''$$

1-2-3. Expression (3)

In the optical system according to the present invention, it is preferable for the surface closest to the image-plane side in the first lens group to satisfy a following condition:

$$0 < Cr1r/f \quad (3)$$

where $Cr1r$ represents a radius of curvature of the surface closest to the image-plane side in the first lens group.

The expression (3) is an expression that defines the radius of curvature of the surface closest to the image-plane side in the first lens group. When the expression (3) is satisfied, the surface closest to the image-plane side in the first lens group has a convex shape toward the object side. Accordingly, it becomes possible to sufficiently correct field curvature. This makes it easier to provide a small and high-performance optical system.

On the contrary, when the expression (3) is not satisfied, the surface closest to the image-plane side in the first lens group is flat or in a concave shape toward the object side. This makes it difficult to correct field curvature, which in turns makes it difficult to implement a smaller optical system.

To achieve the aforementioned advantages of the present invention, it is preferable for the surface closest to the image-plane side in the first lens group to satisfy a following expression (3)', it is more preferable to satisfy an expression (3)'', it is still more preferable to satisfy an expression (3)''', and it is the most preferable to satisfy an expression (3)'''':

$$0.10 < Cr1r/f < 3.00 \quad (3)'$$

$$0.20 < Cr1r/f < 1.60 \quad (3)''$$

$$0.25 < Cr1r/f < 1.20 \quad (3)'''$$

$$0.25 < Cr1r/f < 0.80 \quad (3)''''$$

1-2-4. Expression (4)

In the optical system according to the present invention, the second lens group preferably satisfies a following condition:

$$0.4 \leq f2/f < 3.0 \quad (4)$$

where f2 represents a focal length of the second lens group.

The expression (4) is an expression that defines a ratio of the focal length of the second lens group to the focal length of the entire optical system. When the expression (4) is satisfied, the amount of movement of the second lens group at the time of focusing can be reduced, and reduction in size of the optical system in an overall optical length can be achieved. When the expression (4) is satisfied, the focal length of the second lens group, i.e., the refractive power, falls within a proper range. Accordingly, it becomes possible to suppress variation in aberration relating to change in position of the second lens group at the time of focusing, so that sufficient image formation performance can be achieved with a smaller number of lenses regardless of the object length.

Contrary to this, when a value of f2/f in the expression (4) is equal to or larger than the upper limit, the focal length of the second lens group becomes larger, that is, the refractive power of the second lens group becomes smaller and the amount of movement of the second lens group at the time of focusing becomes larger. This is not preferable since the overall optical length is enlarged. When the value of f2/f in the expression (4) is equal to or below the lower limit, the focal length of the second lens group becomes smaller, i.e., the refractive power of the second lens group becomes larger, variation in aberration relating to the change in position of the second lens group at the time of focusing becomes larger, and the amount of aberration generation becomes larger. This is not preferable because the number of lenses necessary for aberration correction increases and the overall optical length is enlarged for the sake of achieving sufficient image formation performance.

To achieve the aforementioned advantages of the present invention, it is preferable for second lens group to satisfy a following expression (4)', it is more preferable to satisfy an expression (4)'', it is still more preferable to satisfy an expression (4)''', and it is most preferable to satisfy an expression (4)'''':

$$0.5 < f2/f < 2.0 \quad (4)'$$

$$0.5 < f2/f < 1.2 \quad (4)''$$

$$0.5 < f2/f < 1.1 \quad (4)'''$$

$$0.5 < f2/f < 1.0 \quad (4)''''$$

1-2-5. Expression (5)

In the optical system according to the present invention, it is preferable for the surface closest to the object side in the second lens group to satisfy a following condition:

$$0 < Cr2f/f \quad (5)$$

where $Cr2f$ represents a radius of curvature of the surface closest to the object side in the second lens group, and f represents a focal distance of the entire optical system.

The expression (5) is an expression that defines a ratio of the radius of curvature of the surface closest to the object side in the second lens group to the focal length of the entire optical system. When the expression (5) is satisfied, the surface closest to the object side in the second lens group has a convex shape toward the object side. Accordingly, it becomes possible to sufficiently correct spherical aberration and field curvature. This makes it easier to provide a small and high-performance optical system.

On the contrary, when the expression (5) is not satisfied, the surface closest to the object side in the second lens group is flat or concave toward the object side, which is not preferable since it is difficult to correct spherical aberration or field curvature with a small number of lenses.

To achieve the aforementioned advantages of the present invention, it is preferable for the surface closest to the object side in the second lens group to satisfy a following expression (5)', it is more preferable to satisfy an expression (5)'', it is still more preferable to satisfy an expression (5)''', and it is most preferable to satisfy an expression (5)'''':

$$0.10 < Cr2f/f < 3.00 \quad (5)'$$

$$0.20 < Cr2f/f < 1.00 \quad (5)''$$

$$0.25 < Cr2f/f < 0.80 \quad (5)'''$$

$$0.25 < Cr2f/f < 0.60 \quad (5)''''$$

1-2-6. Expression (6)

In the optical system according to the present invention, it is preferable for the surface closest to the image side in the first lens group and the surface closest to the object side in the second lens group to satisfy a following condition:

$$0.65 < Cr2f/Cr1r < 2.00 \quad (6)$$

where $Cr1r$ represents a radius of curvature of the surface closest to the image side in the first lens group, and $Cr2f$ represents a radius of curvature of the surface closest to the object side in the second lens group.

The expression (6) is an expression that defines a ratio of the radius of curvature of the surface closest to the object side in the second lens group to the radius of curvature of the surface closest to the image-plane side in the first lens group. When the expression (6) is satisfied, it becomes possible to sufficiently correct spherical aberration, coma aberration, and sagittal flare with a small number of lenses. This makes it possible to provide a small and high-performance optical system more easily.

On the contrary, when the expression (6) is not satisfied, it becomes difficult to correct spherical aberration, coma aberration, and sagittal flare with a small number of lenses. This is not preferable because the number of lenses necessary for aberration correction increases and the optical system is enlarged for the sake of achieving sufficient image formation performance.

To achieve the aforementioned advantages of the present invention, it is preferable for the surface closest to the object side in the object-side group and the surface closest to the image-plane side in the object-side group to satisfy an expression (6)', and it is more preferable to satisfy an expression (6)":

$$0.65 < Cr2f/Cr1r < 1.30 \quad (6)''$$

$$0.70 < Cr2f/Cr1r < 1.20 \quad (6)'''$$

1-2-7. Expression (7)

In the optical system according to the present invention, it is preferable that the second lens group includes at least one lens having negative refractive power and that the lens having negative refractive power satisfies a following condition:

$$0.50 < (R1+R2)/(R1-R2) < 5.00 \quad (7)$$

where $R1$ represents a radius of curvature of the object-side surface of the lens having negative refractive power included in the second lens group, and $R2$ represents a radius of curvature of an image-plane side surface of the lens having negative refractive power included in the second lens group.

In the optical system according to the present invention, the second lens group preferably includes a lens having negative refractive power. The expression (7) is an expression that defines the shape of the lens having negative refractive power. When the expression (7) is satisfied, the second lens group includes a lens having negative refractive power, the lens having an image-plane side surface smaller in radius of curvature than an object-side surface. In this case, occurrence of longitudinal chromatic aberration can be suppressed and spherical aberration can sufficiently be corrected.

On the contrary, when a value of $(R1+R2)/(R1-R2)$ in the expression (7) is equal to or below the lower limit, the image-plane side surface of the lens having negative refractive power becomes excessively smaller in radius of curvature than the object-side surface. This is not preferable since the amount of the longitudinal chromatic aberration generation increases. When the value of $(R1+R2)/(R1-R2)$ in the expression (7) is equal to or more than the upper limit, the image-plane side surface of the lens having negative refractive power becomes excessively large in radius of curvature. This is not preferable since correction of spherical aberration becomes insufficient.

To achieve the aforementioned advantages of the present invention, it is preferable for a lens having negative refractive power included in the second lens group to satisfy an expression (7)', and it is more preferable to satisfy an expression (7)":

$$0.65 < (R1+R2)/(R1-R2) < 3.00 \quad (7)'$$

$$0.78 < (R1+R2)/(R1-R2) < 2.95 \quad (7)''$$

1-2-8. Expression (8)

In the optical system according to the present invention, it is preferable that the second lens group includes at least one lens having negative refractive power, and that the lens having negative refractive power included in the second lens group to satisfy a following condition:

$$\nu d2n < 45.0 \quad (8)$$

where $\nu d2n$ represents an abbe number of a lens on the d-line, the lens having negative refractive power included in the second lens group.

The expression (8) is an expression that defines an abbe number of the lens having negative refractive power on the d-line, when the second lens group includes the lens having negative refractive power. When the expression (8) is satisfied, chromatic aberration can sufficiently be corrected, and it becomes easier to provide a small and high-performance optical system.

On the contrary, when the expression (8) is not satisfied, sufficient chromatic aberration correction cannot be performed in the second lens group. As a result, variation in chromatic aberration relating to the change in position of the second lens group at the time of focusing becomes larger, and the amount of aberration generation also becomes larger. This is not preferable since the number of lenses necessary for aberration correction increases and the overall optical length is enlarged for the sake of achieving sufficient image formation performance.

To achieve the aforementioned advantages of the present invention, it is preferable for the lens having negative refractive power included in the second lens group to satisfy an expression (8)', and it is more preferable to satisfy an expression (8)":

$$\nu d2n < 40.0 \quad (8)'$$

$$\nu d2n < 35.0 \quad (8)''$$

1-2-9. Expression (9)

In the optical system according to the present invention, it is preferable that the first lens group includes at least one lens having positive refractive power and that the lens having positive refractive power satisfies a following condition:

$$0.009 < \Delta PgF1 \quad (9)$$

where $\Delta PgF1$ represents a deviation of a partial dispersion ratio of the lens having positive refractive power included in the first lens group from a reference line, the reference line being a straight line passing coordinates of partial dispersion ratio values and νd values of C7 (having a partial dispersion ratio of 0.5393 and νd of 60.49) and F2 (having a partial dispersion ratio of 0.5829 and νd of 36.30).

Here, if refractive indexes of a glass with respect to a g-line (435.8 nm), an F-line (486.1 nm), a d-line (587.6 nm), and C-line (656.3 nm) are respectively referred to as Ng, NF, Nd and NC, an abbe number νd and a partial dispersion ratio PgF may be expressed as indicated below:

$$\nu d = (Nd-1)/(NF-NC)$$

$$PgF = (Ng-NF)/(NF-NC)$$

The expression (9) is an expression that defines extraordinaly dispersibility of the lens having positive refractive power included in the first lens group. When the first lens group has a lens which has positive refractive power and which has extraordinaly dispersibility that satisfies the expression (9), various longitudinal chromatic aberrations may sufficiently be corrected.

On the contrary, when the expression (9) is not satisfied, the extraordinaly dispersibility of the lens having positive refractive power included in the first lens group decreases, which is not preferable since correction of the longitudinal chromatic aberration becomes difficult.

To achieve the aforementioned advantages of the present invention, it is preferable for the lens having positive refractive power in the first lens group to satisfy a following expression (9)':

$$0.015 < \Delta PgF1 \qquad (9)'$$

1-2-10. Expression (10)

In the optical system according to the present invention, it is preferable that the first lens group satisfies a following condition:

$$2.6 < |f1|/f \qquad (10)$$

where f1 represents a focal length of the first lens group.

The expression (10) above is an expression that defines a ratio of the focal length of the first lens group to the focal length of the entire optical system. In the optical system according to the present invention, the first lens group may have positive or negative refractive power as described before. In either case, the amount of chromatic aberration generation can be decreased in the first lens group by satisfying the expression (10). When the expression (10) is satisfied, a convergence action of the first lens group having positive refractive power may fall within a proper range. Even when the position of the second lens group changes at the time of focusing, variation in diameter of luminous flux entering into the second lens group can be suppressed. This makes it possible to suppress variation in spherical aberration at the time of focusing and to thereby implement sufficient image formation performance with a small number of lenses. When the first lens group has negative refractive power, a divergence action thereof may fall within a proper range, which makes it possible to suppress increase in diameter of luminous flux entering into the second lens group. Accordingly, reduction in size and weight of the second lens group serving as a focus group can be achieved, and therefore reduction in size and weight of the entire optical system including the lens-barrel construction can be achieved. Moreover, it becomes easy to perform quick focusing operation.

On the contrary, when a value of |f1| in the expression (10) is equal to or below the lower limit, i.e., the focal length of the first lens group becomes smaller, it becomes difficult to decrease the generation amount of chromatic aberration in the first lens group. Since the convergence action of the first lens group having positive refractive power becomes excessively strong, variation in spherical aberration relating to the change in position of the second lens group at the time of focusing becomes larger. As a result, it becomes difficult to provide a high-performance optical system with a small number of lenses. When the value of |f1| in the expression (10) is equal to or below the lower limit in the case where the first lens group has negative refractive power, the divergence action in the first lens group becomes excessively strong, which makes it necessary to increase an external diameter of the second lens group serving as a focus group. In this case, it becomes difficult to reduce the size of the entire optical system including the lens-barrel construction, which in turns makes it difficult to perform quick focusing operation.

To achieve the aforementioned advantages of the present invention, it is preferable for the first lens group to satisfy an expression (10)', and it is more preferable to satisfy a following expression (10)":

$$3.1 < |f1|/f \qquad (10)'$$

$$3.3 < |f1|/f \qquad (10)''$$

1-2-11. Expression (11)

In the optical system according to the present invention, it is preferable that the second lens group includes at least one lens having positive refractive power and that the lens having positive refractive power satisfies a following condition:

$$0.009 < \Delta PgF3 \qquad (11)$$

where ΔPgF3 represents a deviation of a partial dispersion ratio of the lens having positive refractive power included in the second lenses group from a reference line, the reference line being a straight line passing coordinates of partial dispersion ratio values and νd values of C7 (having a partial dispersion ratio of 0.5393 and νd of 60.49) and F2 (having a partial dispersion ratio of 0.5829 and νd of 36.30).

In the optical system according to the present invention, the second lens group preferably includes a lens having positive refractive power. The expression (11) is an expression that defines extraordinaly dispersibility of the lens having positive refractive power. It is preferable that the second lens group includes a lens having positive refractive power which satisfies the expression (11) since longitudinal chromatic aberration can sufficiently be corrected and variation in the chromatic aberration at the time of focusing can be suppressed.

On the contrary, when the expression (11) is not satisfied, the extraordinaly dispersibility of the lens having positive refractive power included in the second lens group decreases, which is not preferable since it becomes difficult to correct the longitudinal chromatic aberration. The above case is not preferable either since variation in chromatic aberration relating to the change in position of the second lens group at the time of focusing also increases.

To achieve the aforementioned advantages of the present invention, it is preferable for the lens having positive refractive power to satisfy a following expression (11)':

$$0.015 < \Delta PgF3 \qquad (11)'$$

1-2-12. Expression (12)

When the optical system includes an image stabilization group, it is preferable that the image stabilization group satisfies a following condition. When the condition is satisfied, variation in aberration at the time of image stabilization can be suppressed, and high image formation performance can be provided even in image stabilization operation while the optical system is kept in a small size.

$$0.1<|(1-\beta vc)\times\beta r|<0.8 \qquad (12)$$

wherein the image stabilization group refers to a lens group movable in a direction perpendicular to the optical axis, βvc represents a lateral magnification of the image stabilization group at infinity focusing, and βr represents a composite lateral magnification when all the lenses, which are positioned on the image-plane side behind the image stabilization group, focus at infinity.

2. Image Pickup Apparatus

A description is now given of an image pickup apparatus according to the present invention. The image pickup apparatus according to the present invention includes: an optical system according to the present invention; and an image sensor provided on an image-plane side of the optical system for converting an optical image formed by the optical system into an electrical signal. The image sensor and the like are not particularly limited. Solid-state image sensors, such as CCD sensors and CMOS sensors, may be used. The image pickup apparatus according to the present invention is suitable as an image pickup apparatus with use of these solid-state image sensors such as digital cameras and video cameras. It is naturally understood that the image pickup apparatus of the present invention may be of a lens-fixed type wherein lenses are fixed to a casing, and may be of a lens-interchangeable type, such as single-lens reflex cameras and mirror-less single lens cameras.

Now, the present invention will specifically be described by using examples. However, the present invention is not limited to the following examples. Optical systems in each of the following examples are imaging optical systems used for image pickup apparatuses (optical apparatuses), such as digital cameras, video cameras, and silver-salt film cameras. In each of the cross sectional views of lenses, the left-hand side of the page is an object side, and the right-hand side is an image-plane side.

Example 1

(1) Construction of Optical System

FIG. 1 is a cross sectional view of lenses for illustrating the lens construction when an optical system of Example 1 according to the present invention focuses at infinity. The optical system includes, in order from the object side: a first lens group G1 having positive refractive power; a second lens group G2 having positive refractive power; and a third lens group G3 having positive refractive power.

The first lens group G1 includes, in order from the object side: a lens L1 having positive refractive power; a cemented lens formed by cementing a lens L2 having positive refractive power and a lens L3 having negative refractive power; and a lens L4 having negative refractive power with a concave facing the image side.

The second lens group G2 includes, in order from the object side: a lens L5 having positive refractive power with a convex facing the object side; and a cemented lens formed by cementing a lens L6 having negative refractive power and a lens L7 having positive refractive power, the lens L6 having a concave with a high radius of curvature on the image side.

The third lens group G3 includes, in order from the object side: a lens L8 having negative refractive power; an aperture stop S; a lens L9 having positive refractive power; a lens L10 having negative refractive power; a cemented lens formed by cementing a lens L11 having negative refractive power and a lens L12 having positive refractive power, the lens L11 having a concave facing the object side; and a lens L13 having positive refractive power with a convex facing the image side.

When the optical system of Example 1 focuses on from an object at infinity to a short-distance object, the first lens group G1 and the third lens group G3 are fixed in an optical axis direction while the second lens group G2 moves to an image plane IMG side along the optical axis. When vibration occurs due to hand shake and the like during imaging, blurring of an image on the image plane IMG is corrected by moving the lens L9 in the third lens group G3, which serves as an image stabilization group, in the direction perpendicular to the optical axis.

In FIG. 1, a reference character "S" illustrated in the third lens group G3 denotes an aperture stop. A reference character "CG" illustrated on the image-plane side of the third lens group G3 denotes a low pass filter, a cover glass, and the like. A reference character "IMG" illustrated on the image-plane side of "CG" denotes an image plane. The reference character "IMG" specifically denotes the imaging plane of a solid-state image sensor, such as CCDs and CMOS sensors, or a film plane of a silver-salt film. These reference characters are the same in each of the cross sectional views of lenses illustrated in the following examples, and therefore a description of these reference characters is omitted.

(2) Typical Numerical Values

A description is now given of typical numerical values obtained by applying specific values of the optical system. Table 1 indicates lens data of the optical system. In Table 1 (1-1), "Surface No." denotes the number of lens surfaces (surface number) counted from the object side, "r" denotes a radius of curvature of the lens surfaces, "d" denotes an axial interval between lens surfaces, "Nd" denotes a refractive index with respect to a d-line (wavelength λ=587.6 nm), and "vd" denotes an abbe number with respect to the d-line. In Table 1 (1-1), ΔPgF denotes a deviation of a partial dispersion ratio of a lens from a reference line, the reference line being a straight line passing coordinates of partial dispersion ratio values and vd values of C7 (having a partial dispersion ratio of 0.5393 and vd of 60.49) and F2 (having a partial dispersion ratio of 0.5829 and vd of 36.30). The value ΔPgF corresponds to one of the above-mentioned ΔPgF1 to ΔPgF3. Table 1 (1-2) indicates variable intervals on the optical axis illustrated in Table 1 (1-1). In each of the tables, all the lengths are stated in the unit of "mm", and all the image viewing angels are stated in the unit of "degree". Since these rules apply to the following examples, a description thereof will be omitted below. Table 7 indicates numerical values used in each of the expressions (1) to (12).

Figure 2:
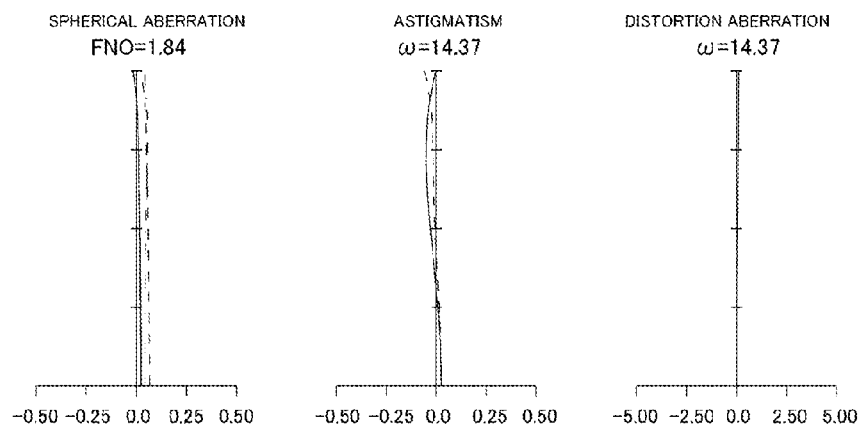
FIG. 2 illustrates diagrams of spherical aberration, astigmatism, and distortion aberration when the optical system of Example 1 focuses at infinity.

FIG. 2 illustrates longitudinal aberration diagrams of the optical system in infinity focusing. The longitudinal aberration diagrams illustrate a spherical aberration, an astigmatism, and a distortion aberration in order from the left-hand side on the page. In the diagram illustrating the spherical aberration, a vertical axis represents a ratio to a maximum aperture and a horizontal axis represents a defocus amount. In the diagram, a solid line, a dashed line, and a dashed dotted line represent spherical aberrations on a d-line (wavelength λ=587.6 nm), a C-line (wavelength λ=656.3 nm), and a g-line (wavelength λ=435.8 nm), respectively. In the diagram illustrating astigmatism, a vertical axis represents an image height and a horizontal axis represents a defocus amount. In the diagram, a solid line and a dashed line represent astigmatisms on a sagittal plane and a meridional plane, respectively. In the diagram illustrating distortion aberration, a vertical axis represents an image height and a horizontal axis represents % to indicate distortion aberration. The details regarding these longitudinal aberration diagrams apply to the following examples, and therefore a description thereof will be omitted below.

The optical system of the present example has a focal length (f), an F-number (Fno), and a half angle of view ($\bar{\omega}$) as described below:

$f$=84.364

$Fno$=1.837

$\bar{\omega}$=14.368

TABLE 1

(1-1)

| Surface NO. | r | d | Nd | vd | ΔPgf |
|---|---|---|---|---|---|
| 1 | 79.2235 | 6.200 | 2.00100 | 29.13 | 0.0036 |
| 2 | 1170.2397 | 0.889 | | | |
| 3 | 51.6042 | 6.815 | 1.43700 | 95.10 | 0.0564 |
| 4 | −349.4146 | 1.500 | 1.83400 | 37.34 | |
| 5 | 112.9108 | 3.159 | | | |
| 6 | 3491.9755 | 1.500 | 1.56732 | 42.84 | |
| 7 | 39.3633 | D7 | | | |
| 8 | 37.8437 | 5.080 | 1.88100 | 40.14 | |
| 9 | 134.6845 | 0.200 | | | |
| 10 | 81.0310 | 1.300 | 1.71736 | 29.50 | |
| 11 | 23.7894 | 7.640 | 1.49700 | 81.61 | 0.0375 |
| 12 | −1512.1806 | D12 | | | |
| 13 | 209.5332 | 1.200 | 1.61293 | 37.00 | |
| 14 | 27.2973 | 5.215 | | | |
| 15 | INF | 4.200 | | | (Aperture stop) |
| 16 | 71.1439 | 2.700 | 1.83481 | 42.72 | |
| 17 | −1255.7332 | 0.500 | | | |
| 18 | −1519.4218 | 0.800 | 1.62004 | 36.30 | |
| 19 | 66.9349 | 5.385 | | | |
| 20 | −28.8090 | 1.000 | 1.71736 | 29.50 | |
| 21 | 86.3790 | 7.301 | 1.91082 | 35.25 | |
| 22 | −41.7351 | 0.200 | | | |
| 23 | −13463.9676 | 4.618 | 2.00100 | 29.13 | |
| 24 | −79.6376 | 42.294 | | | |
| 25 | 0.0000 | 2.000 | 1.51680 | 64.20 | |
| 26 | 0.0000 | 1.000 | | | |

(1-2)

| Imaging distance | INF | 800.00 |
|---|---|---|
| D7 | 9.122 | 1.822 |
| D12 | 1.484 | 8.784 |

Example 2

(1) Construction of Optical System

Figure 3:
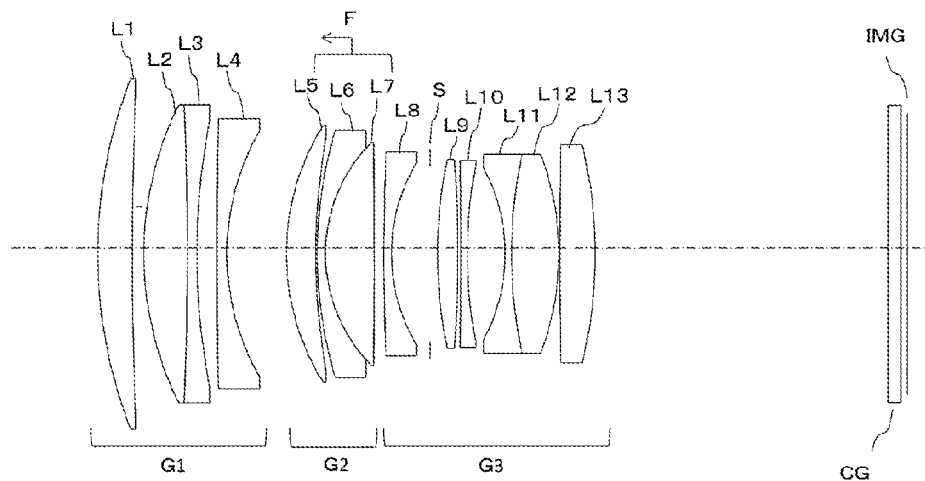
FIG. 3 is a cross sectional view illustrating an example of lens construction in an optical system of Example 2 of the present invention.

FIG. 3 is a cross sectional view of lenses for illustrating the lens construction when an optical system of Example 2 according to the present invention focuses at infinity. The optical system includes, in order from the object side: a first lens group G1 having positive refractive power; a second lens group G2 having positive refractive power, and a third lens group G3 having positive refractive power.

The first lens group G1 includes, in order from the object side: a lens L1 having positive refractive power; a cemented lens formed by cementing a lens L2 having positive refractive power and a lens L3 having negative refractive power; and a lens L4 having negative refractive power with a concave facing the image side.

The second lens group G2 includes, in order from the object side: a lens L5 having positive refractive power with a convex facing the object side; and a cemented lens formed by cementing a lens L6 having negative refractive power and a lens L7 having positive refractive power, the lens L6 having a concave with a high radius of curvature on the image side.

The third lens group G3 includes, in order from the object side: a lens L8 having negative refractive power; an aperture stop S; a lens L9 having positive refractive power; a lens L10 having negative refractive power; a cemented lens formed by cementing a lens L11 having negative refractive power and a lens L12 having positive refractive power, the lens L11 having a concave facing the object side; and a lens L13 having positive refractive power with a convex facing the image side.

When the optical system of the Example 2 focuses on from an object at infinity to a short-distance object, the first lens group G1 and the third lens group G3 are fixed in an optical axis direction while the second lens group G2 moves to an image plane IMG side along the optical axis. When vibration occurs due to hand shake and the like during imaging, blurring of an image on the image plane IMG is corrected by moving the lens L10 in the third lens group G3, which serves as an image stabilization group, in the direction perpendicular to the optical axis.

(2) Typical Numerical Values

Figure 4:
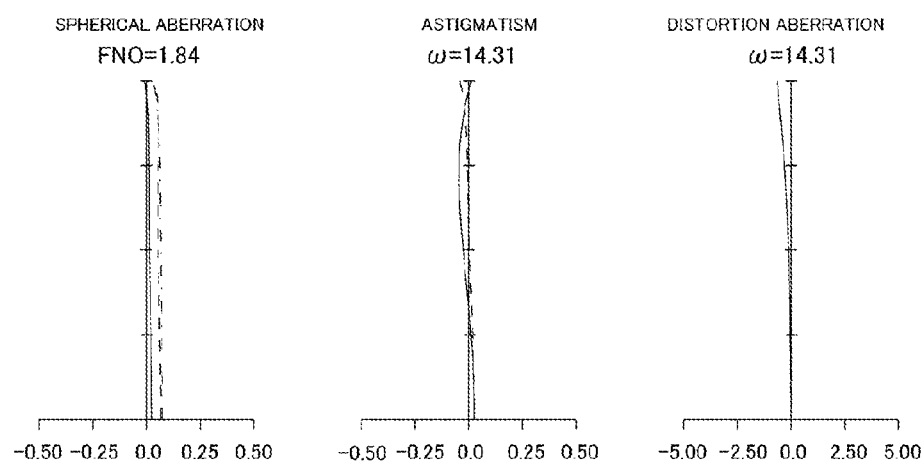
FIG. 4 illustrates diagrams of spherical aberration, astigmatism, and distortion aberration when the optical system of Example 2 focuses at infinity.

A description is now given of typical numerical values obtained by applying specific values of the optical system. Table 2 (2-1) indicates lens data of the optical system, and Table 2 (2-2) indicates variable intervals on the optical axis illustrated in Table 2 (2-1). Table 7 indicates numerical values used in each of the expressions (1) to (12). Furthermore, FIG. 4 illustrates longitudinal aberration diagrams when the optical system focuses at infinity.

The optical system of the present example has a focal length (f), an F-number (Fno), and a half angle of view ($\bar{\omega}$) as described below:

$f$=85.383

$Fno$=1.835

$\bar{\omega}$=14.313

TABLE 2

(2-1)

| Surface NO. | r | d | Nd | vd | ΔPgf |
|---|---|---|---|---|---|
| 1 | 73.9028 | 5.364 | 2.00100 | 29.13 | 0.0036 |
| 2 | 566.6963 | 1.819 | | | |
| 3 | 51.6297 | 6.718 | 1.43700 | 95.10 | 0.0564 |
| 4 | −561.2666 | 1.500 | 1.83400 | 37.34 | |
| 5 | 105.4748 | 3.174 | | | |
| 6 | 1023.6021 | 1.500 | 1.54814 | 45.82 | |
| 7 | 37.8688 | D7 | | | |
| 8 | 37.2843 | 4.583 | 1.88100 | 40.14 | |
| 9 | 103.0000 | 0.200 | | | |
| 10 | 65.6202 | 1.300 | 1.75520 | 27.53 | |
| 11 | 24.3217 | 7.561 | 1.49700 | 81.61 | 0.0375 |
| 12 | −1801.5179 | D12 | | | |
| 13 | 344.5212 | 1.200 | 1.64769 | 33.84 | |

TABLE 2-continued (2-1)

| Surface NO. | r | d | Nd | vd | ΔPgf |
|---|---|---|---|---|---|
| 14 | 27.1594 | 5.972 | | | |
| 15 | INF | 1.200 | | | (Aperture stop) |
| 16 | 70.6898 | 3.128 | 1.83481 | 42.72 | |
| 17 | −210.3942 | 0.500 | | | |
| 18 | −908.0358 | 1.000 | 1.83481 | 42.72 | |
| 19 | 71.4025 | 5.895 | | | |
| 20 | −27.6685 | 1.000 | 1.72825 | 28.32 | |
| 21 | 73.2794 | 7.325 | 1.91082 | 35.25 | |
| 22 | −43.2675 | 0.200 | | | |
| 23 | 1368.9942 | 5.495 | 2.00100 | 29.13 | |
| 24 | −69.0631 | 45.502 | | | |
| 25 | 0.0000 | 2.000 | 1.51680 | 64.20 | |
| 26 | 0.0000 | 1.000 | | | |

(2-2)

| Imaging distance | INF | 800.00 |
|---|---|---|
| D7 | 9.262 | 1.798 |
| D12 | 1.483 | 8.948 |

Example 3

(1) Construction of Optical System

Figure 5:
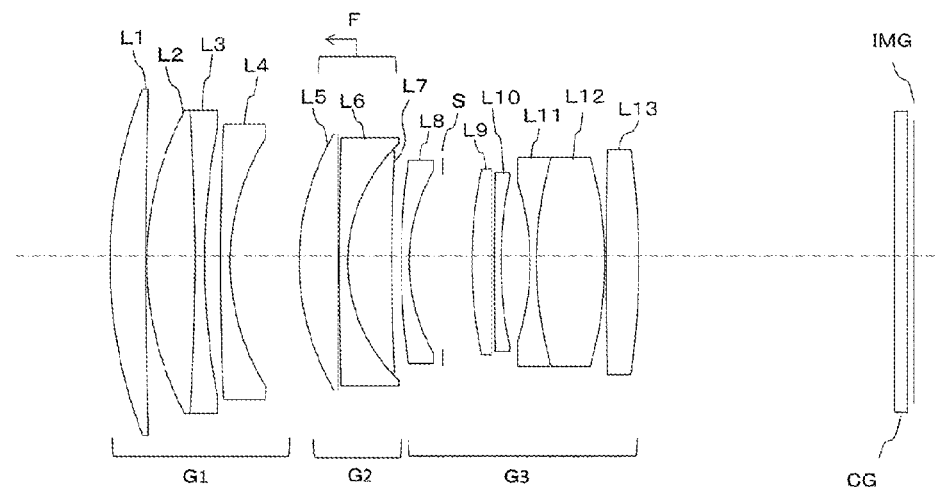
FIG. 5 is a cross sectional view illustrating an example of lens construction in an optical system of Example 3 of the present invention.

FIG. 5 is a cross sectional view of lenses for illustrating the lens construction when an optical system of Example 3 according to the present invention focuses at infinity. The optical system includes, in order from the object side: a first lens group G1 having positive refractive power; a second lens group G2 having positive refractive power; and a third lens group G3 having positive refractive power.

The first lens group G1 includes, in order from the object side: a lens L1 having positive refractive power; a cemented lens formed by cementing a lens L2 having positive refractive power and a lens L3 having negative refractive power; and a lens L4 having negative refractive power with a concave facing the image side.

The second lens group G2 includes, in order from the object side: a lens L5 having positive refractive power with a convex facing the object side; and a cemented lens formed by cementing a lens L6 having negative refractive power and a lens L7 having positive refractive power, the lens L6 having a concave with a high radius of curvature on the image side.

The third lens group G3 includes, in order from the object side: a lens L8 having negative refractive power; an aperture stop S; a lens L9 having positive refractive power; a lens L10 having negative refractive power; a cemented lens formed by cementing a lens L11 having negative refractive power and a lens L12 having positive refractive power, the lens L11 having a concave facing the object side; and a lens L13 having positive refractive power with a convex facing the image side.

When the optical system of Example 3 focuses on from an object at infinity to a short-distance object, the first lens group G1 and the third lens group G3 are fixed in an optical axis direction while the second lens group G2 moves to an image plane IMG side along the optical axis. When vibration occurs due to hand shake and the like during imaging, blurring of an image on the image plane IMG is corrected by moving the lens L9 in the third lens group G3, which serves as an image stabilization group, in the direction perpendicular to the optical axis.

(2) Typical Numerical Values

Figure 6:
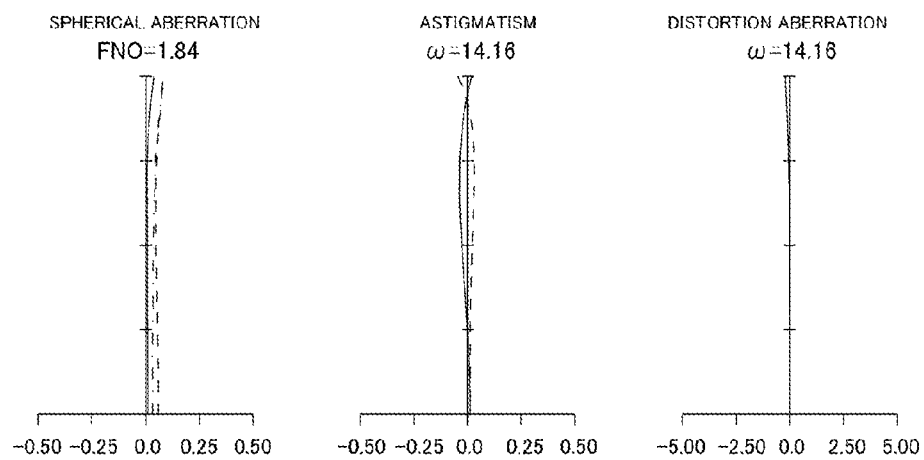
FIG. 6 illustrates diagrams of spherical aberration, astigmatism, and distortion aberration when the optical system of Example 3 focuses at infinity.

A description is now given of typical numerical values obtained by applying specific values of the optical system. Table 3 (3-1) indicates lens data of the optical system, and Table 3 (3-2) indicates variable intervals on the optical axis illustrated in Table 3 (3-1). Table 7 indicates numerical values used in each of the expressions (1) to (12). Furthermore, FIG. 6 illustrates longitudinal aberration diagrams when the optical system focuses at infinity.

The optical system of the present example has a focal distance (f), an F-number (Fno), and a half angle of view ($\bar{\omega}$) as described below:

$f=85.959$ $Fno=1.838$ $\bar{\omega}=14.157$

TABLE 3

(3-1)

| Surface NO. | r | d | Nd | vd | ΔPgf |
|---|---|---|---|---|---|
| 1 | 72.0350 | 5.488 | 1.95375 | 32.32 | 0.0000 |
| 2 | 728.5398 | 0.200 | | | |
| 3 | 49.2221 | 7.366 | 1.43700 | 95.10 | 0.0564 |
| 4 | −341.0822 | 1.500 | 1.83400 | 37.34 | |
| 5 | 107.6632 | 2.435 | | | |
| 6 | 444.3058 | 1.500 | 1.51680 | 64.20 | |
| 7 | 35.7914 | D7 | | | |
| 8 | 38.3849 | 5.977 | 1.88100 | 40.14 | |
| 9 | 13231.0876 | 0.200 | | | |
| 10 | 647.1575 | 1.300 | 1.71736 | 29.50 | |
| 11 | 24.6070 | 6.742 | 1.49700 | 81.61 | 0.0375 |
| 12 | 315.6135 | D12 | | | |
| 13 | 113.5779 | 1.200 | 1.64769 | 33.84 | |
| 14 | 27.7768 | 5.158 | | | |
| 15 | INF | 4.500 | | | (Aperture stop) |
| 16 | 68.8655 | 2.971 | 1.88100 | 40.14 | |
| 17 | 7309.6063 | 0.500 | | | |
| 18 | 853.4621 | 1.000 | 1.67270 | 32.17 | |
| 19 | 63.6967 | 4.448 | | | |
| 20 | −39.5793 | 1.000 | 1.69895 | 30.05 | |
| 21 | 56.9319 | 10.500 | 1.95375 | 32.32 | |
| 22 | −57.3431 | 0.200 | | | |
| 23 | 678.7679 | 5.000 | 1.95375 | 32.32 | |
| 24 | −126.0257 | 39.3517 | | | |
| 25 | 0.0000 | 2.000 | 1.5168 | 64.2 | |
| 26 | 0.0000 | 1.000 | | | |

(3-2)

| Imaging distance | INF | 800.00 |
|---|---|---|
| D7 | 10.603 | 1.921 |
| D12 | 1.491 | 10.174 |

Example 4

(1) Construction of Optical System

Figure 7:
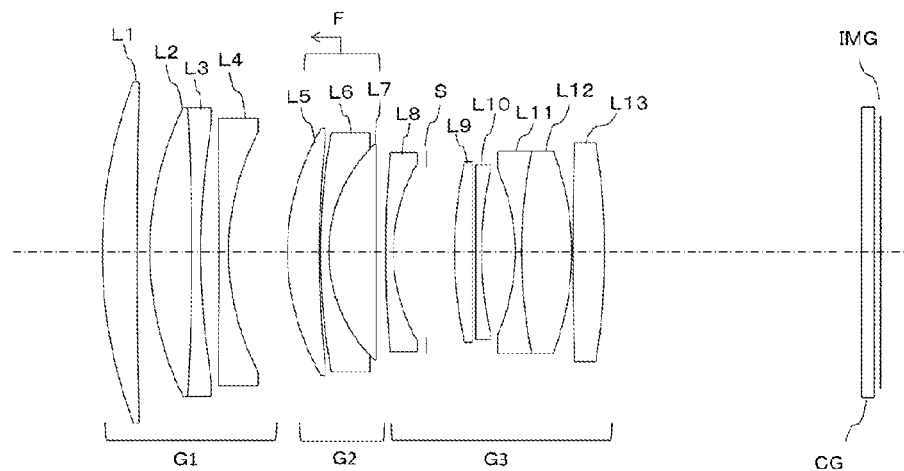
FIG. 7 is a cross sectional view illustrating an example of lens construction in an optical system of Example 4 of the present invention.

FIG. 7 is a cross sectional view of lenses for illustrating the lens construction when an optical system of Example 4 according to the present invention focuses at infinity. The optical system includes, in order from the object side: a first lens group G1 having positive refractive power; a second lens group G2 having positive refractive power; and a third lens group G3 having positive refractive power.

The first lens group G1 includes, in order from the object side: a lens L1 having positive refractive power; a cemented lens formed by cementing a lens L2 having positive refractive power and a lens L3 having negative refractive power; and a lens L4 having negative refractive power with a concave facing the image side.

The second lens group G2 includes, in order from the object side: a lens L5 having positive refractive power with a convex facing the object side; and a cemented lens formed by cementing a lens L6 having negative refractive power and a lens L7 having positive refractive power, the lens L6 having a concave with a high radius of curvature on the image side.

The third lens group G3 includes, in order from the object side: a lens L8 having negative refractive power; an aperture stop; a lens L9 having positive refractive power; a lens L10 having negative refractive power; a cemented lens formed by cementing a lens L11 having negative refractive power and a lens L12 having positive refractive power, the lens L11 having a concave facing the object side; and a lens L13 having positive refractive power with a convex facing the image side.

When the optical system of Example 4 focuses on from an object at infinity to a short-distance object, the first lens group G1 and the third lens group G3 are fixed in an optical axis direction while the second lens group G2 moves to an image plane IMG side along the optical axis. When vibration occurs due to hand shake and the like during imaging, blurring of an image on the image plane IMG is corrected by moving the lens L9 in the third lens group G3, which serves as an image stabilization group, in the direction perpendicular to the optical axis.

(2) Typical Numerical Values

Figure 8:
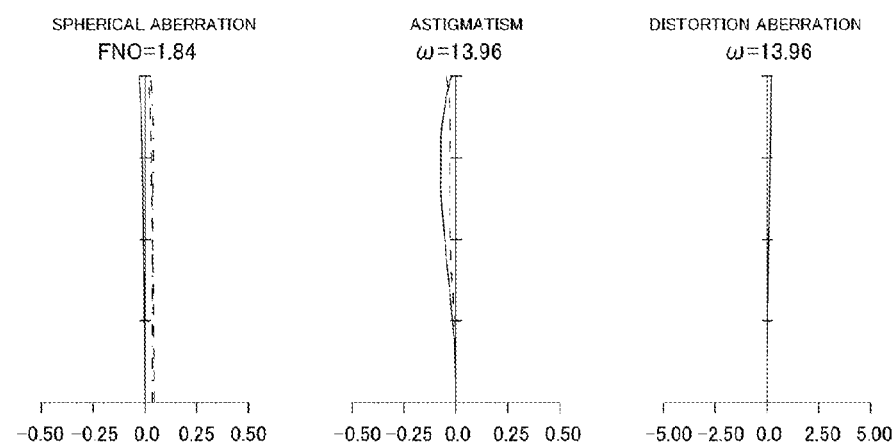
FIG. 8 illustrates diagrams of spherical aberration, astigmatism, and distortion aberration when the optical system of Example 4 focuses at infinity.

A description is now given of typical numerical values obtained by applying specific values of the optical system. Table 4 (4-1) indicates lens data of the optical system, and Table 4 (4-2) indicates variable intervals on the optical axis illustrated in Table 4 (4-1). Table 7 indicates numerical values used in each of the expressions (1) to (12). Furthermore, FIG. 8 illustrates longitudinal aberration diagrams when the optical system focuses at infinity.

The optical system of the present example has a focal length (f), an F-number (Fno), and a half angle of view ($\bar{\omega}$) as described below:

$f$=86.875

$Fno$=1.836

$\bar{\omega}$=13.958

TABLE 4

(4-1)

| Surface NO. | r | d | Nd | vd | ΔPgf |
|---|---|---|---|---|---|
| 1 | 75.0788 | 5.559 | 1.95375 | 32.32 | 0.0000 |
| 2 | 1114.9797 | 2.071 | | | |
| 3 | 52.3164 | 6.622 | 1.43700 | 95.10 | 0.0564 |
| 4 | −421.8613 | 1.500 | 1.83400 | 37.34 | |
| 5 | 126.5094 | 2.901 | | | |

TABLE 4-continued (4-1)

| Surface NO. | r | d | Nd | vd | ΔPgf |
|---|---|---|---|---|---|
| 6 | −1536.7588 | 1.500 | 1.57099 | 50.80 | |
| 7 | 40.4021 | D7 | | | |
| 8 | 38.2662 | 5.060 | 1.88100 | 40.14 | |
| 9 | 166.6929 | 0.200 | | | |
| 10 | 106.0353 | 1.300 | 1.71736 | 29.50 | |
| 11 | 23.6191 | 7.608 | 1.49700 | 81.61 | 0.0375 |
| 12 | −4637.3482 | D12 | | | |
| 13 | 172.3503 | 1.200 | 1.62004 | 36.30 | |
| 14 | 27.8605 | 5.261 | | | |
| 15 | INF | 4.500 | | | (Aperture stop) |
| 16 | 65.8975 | 2.800 | 1.83481 | 42.72 | |
| 17 | −91477.3712 | 0.500 | | | |
| 18 | 4137.3176 | 1.000 | 1.62004 | 36.30 | |
| 19 | 60.5074 | 5.324 | | | |
| 20 | −31.6920 | 1.000 | 1.71736 | 29.50 | |
| 21 | 78.8054 | 8.006 | 1.95375 | 32.32 | |
| 22 | −44.9277 | 0.200 | | | |
| 23 | 595.3414 | 5.000 | 1.95375 | 32.32 | |
| 24 | −111.2031 | 40.970 | | | |
| 25 | 0.0000 | 2.000 | 1.51680 | 64.20 | |
| 26 | 0.0000 | 1.0000 | | | |

(4-2)

| Imaging distance | INF | 800.00 |
|---|---|---|
| D7 | 9.372 | 1.500 |
| D12 | 1.500 | 9.372 |

Example 5

(1) Construction of Optical System

Figure 9:
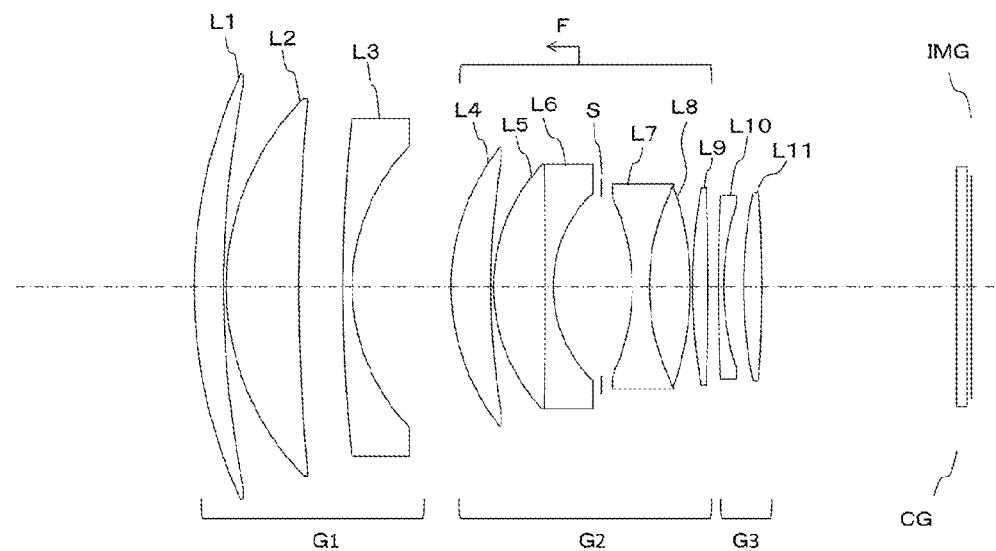
FIG. 9 is a cross sectional view illustrating an example of lens construction of Example 5 of the present invention.

FIG. 9 is a cross sectional view of lenses for illustrating the lens construction when an optical system of Example 5 according to the present invention focuses at infinity. The optical system includes, in order from the object side: a first lens group G1 having positive refractive power, a second lens group G2 having positive refractive power, and a third lens group G3 having positive refractive power.

The first lens group G1 includes, in order from the object side: a lens L1 having positive refractive power; a lens L2 having positive refractive power; and a lens L3 having negative refractive power with a concave facing the image side.

The second lens group G2 includes, in order from the object side: a lens L4 having positive refractive power with a convex facing the object side; a cemented lens formed by cementing a lens L5 having positive refractive power with a convex facing the object side and a lens L6 having negative refractive power, the lens L6 having a concave with a high radius of curvature on the image side; an aperture stop S; a cemented lens formed by cementing a biconcave lens L7 having negative refractive power and a lens L8 having positive refractive power; and a lens L9 having positive refractive power.

The third lens group G3 includes, in order from the object side: a lens L10 having negative refractive power; and a lens L11 having positive refractive power.

When the optical system of Example 5 focuses on from an object at infinity to a short-distance object, the first lens group G1 and the third lens group G3 are fixed in an optical axis direction, while the second lens group G2 moves to an image plane IMG side along the optical axis. When vibration occurs due to hand shake and the like during imaging, blurring of an image on the image plane IMG is corrected by moving the second lens group G2, which serves as an image stabilization group, in the direction perpendicular to the optical axis.

(2) Typical Numerical Values

Figure 10:
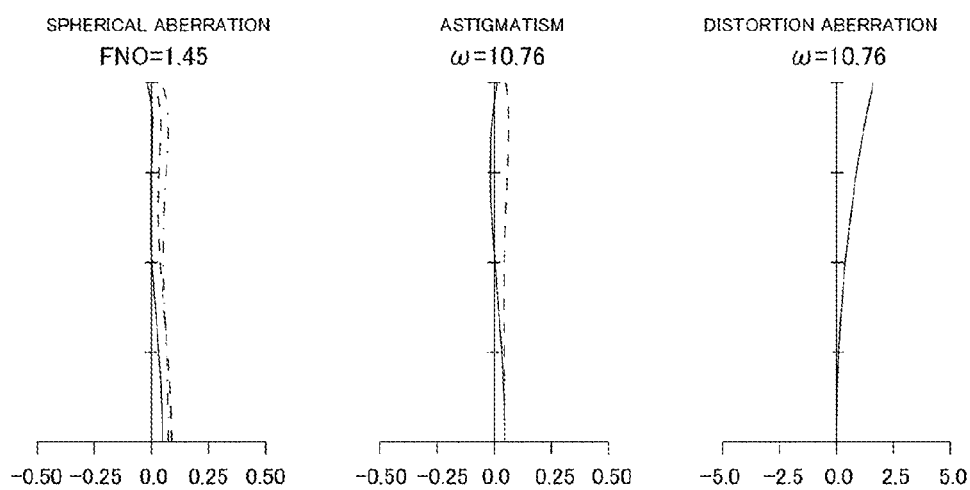
FIG. 10 illustrates diagrams of spherical aberration, astigmatism, and distortion aberration when the optical system of Example 5 focuses at infinity.

A description is now given of typical numerical values obtained by applying specific values of the optical system. Table 5 (5-1) indicates lens data of the optical system, and Table 5 (5-2) indicates variable intervals on the optical axis illustrated in Table 5 (5-1). Table 7 indicates numerical values used in each of the expressions (1) to (12). Furthermore, FIG. 10 illustrates longitudinal aberration diagrams when the optical system focuses at infinity.

The optical system of the present example has a focal length (f), an F-number (Fno), and a half angle of view (W) as described below:

$f=112.109$ $Fno=1.445$ $\overline{\omega}=10.759$

TABLE 5

(5-1)

| Surface NO. | r | d | Nd | vd | ΔPgf |
|---|---|---|---|---|---|
| 1 | 96.7439 | 5.737 | 1.95375 | 32.32 | 0.0000 |
| 2 | 199.2286 | 0.500 | | | |
| 3 | 51.1798 | 13.999 | 1.43700 | 95.10 | 0.0564 |
| 4 | 368.4500 | 8.500 | | | |
| 5 | 318.1258 | 1.800 | 1.62004 | 36.30 | |
| 6 | 38.4465 | D6 | | | |
| 7 | 42.7291 | 7.637 | 1.59282 | 68.62 | 0.0194 |
| 8 | 147.5531 | 0.500 | | | |
| 9 | 33.7593 | 10.000 | 1.43700 | 95.10 | 0.0564 |
| 10 | −1664.0285 | 1.500 | 1.67270 | 32.17 | |
| 11 | 24.8668 | 9.275 | | | |
| 12 | INF | 5.963 | | | (Aperture stop) |
| 13 | −40.6766 | 3.314 | 1.80610 | 33.27 | |
| 14 | 42.2856 | 7.871 | 1.95375 | 32.32 | |
| 15 | −58.6609 | 0.500 | | | (Aperture stop) |
| 16 | 110.2689 | 2.876 | 2.00100 | 29.13 | |
| 17 | −616.3326 | D(19) | | | |
| 18 | 388.0620 | 1.000 | 1.60342 | 38.01 | |
| 19 | 50.6042 | 3.894 | | | |
| 20 | 91.1632 | 3.440 | 1.72916 | 54.67 | |
| 21 | −262.1401 | 37.574 | | | |
| 22 | 0.0000 | 2.000 | 1.51680 | 64.20 | |
| 23 | 0.0000 | 1.000 | | | |

(5-2)

| Imaging distance | INF | 1000.00 |
|---|---|---|
| D6 | 19.053 | 3.788 |
| D12 | 2.068 | 17.332 |

Example 6

(1) Construction of Optical System

Figure 11:
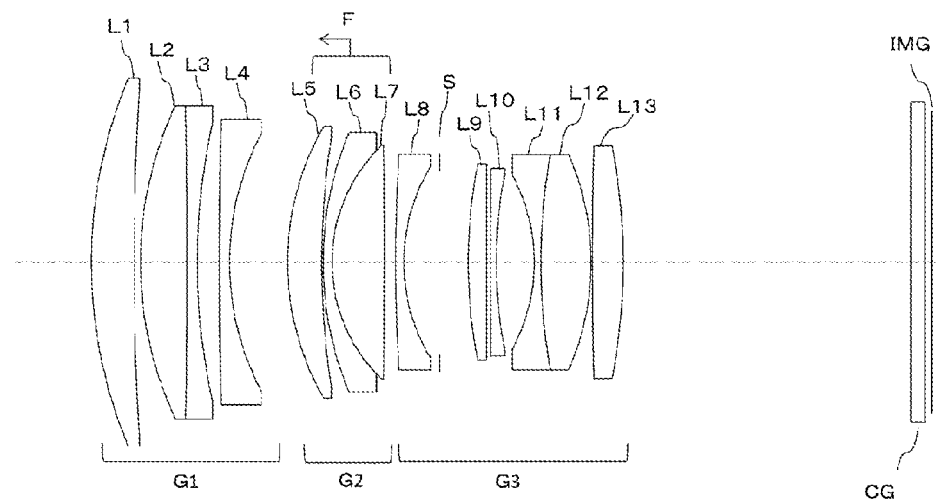
FIG. 11 is a cross sectional view illustrating an example of lens construction in an optical system of Example 6 of the present invention.

FIG. 11 is a cross sectional view of lenses for illustrating the lens construction when an optical system of Example 6 according to the present invention focuses at infinity. The optical system includes, in order from the object side: a first lens group G1 having negative refractive power, a second lens group G2 having positive refractive power, and a third lens group G3 having positive refractive power.

The first lens group G1 includes, in order from the object side: a lens L1 having positive refractive power; a cemented lens formed by cementing a lens L2 having positive refractive power and a lens L3 having negative refractive power; and a lens L4 having negative refractive power with a concave facing the image side.

The second lens group G2 includes, in order from the object side: a lens L5 having positive refractive power with a convex facing the object side; and a cemented lens formed by cementing a lens L6 having negative refractive power and a lens L7 having positive refractive power, the lens L6 having a concave with a high radius of curvature on the image side.

The third lens group G3 includes, in order from the object side: a lens L8 having negative refractive power; an aperture stop S; a lens L9 having positive refractive power; a lens L10 having negative refractive power; a cemented lens formed by cementing a lens L11 having negative refractive power and a lens L12 having positive refractive power, the lens L11 having a concave facing the object side; and a lens L13 having positive refractive power with a convex facing the image side.

When the optical system of Example 6 focuses on from an object at infinity to a short-distance object, the first lens group G1 and the third lens group G3 are fixed in an optical axis direction, while the second lens group G2 moves to an image plane IMG side along the optical axis. When vibration occurs due to hand shake and the like during imaging, blurring of an image on the image plane IMG is corrected by moving the lens L9 in the third lens group G3, which serves as an image stabilization group, in the direction perpendicular to the optical axis.

(2) Typical Numerical Values

Figure 12:
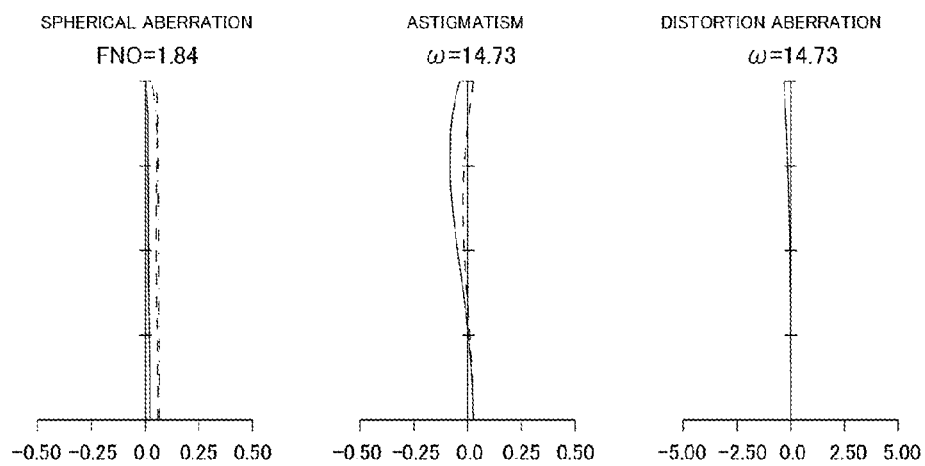
FIG. 12 illustrates diagrams of spherical aberration, astigmatism, and distortion aberration when the optical system of Example 6 focuses at infinity.

A description is now given of typical numerical values obtained by applying specific values of the optical system. Table 6 (6-1) indicates lens data of the optical system, and Table 6 (6-2) indicates variable intervals on the optical axis illustrated in Table 6 (6-1). Table 7 indicates numerical values used in each of the expressions (1) to (12). Furthermore, FIG. 12 illustrates longitudinal aberration diagrams when the optical system focuses at infinity.

The optical system of the present example has a focal length (f), an F-number (Fno), and a half angle of view (W) as described below:

$f=82.600$ $Fno=1.831$ $\overline{\omega}=14.726$

TABLE 6

(6-1)

| Surface NO. | r | d | Nd | vd | ΔPgf |
|---|---|---|---|---|---|
| 1 | 67.7293 | 6.148 | 2.00100 | 29.13 | 0.0036 |
| 2 | 388.3279 | 0.940 | | | |
| 3 | 52.3968 | 6.694 | 1.49700 | 81.61 | 0.0375 |
| 4 | −1410.3290 | 1.500 | 1.83400 | 37.34 | |
| 5 | 90.6135 | 3.180 | | | |
| 6 | 713.7990 | 1.480 | 1.73985 | 36.59 | |
| 7 | 39.3695 | D7 | | | |
| 8 | 38.9587 | 4.930 | 1.88100 | 40.14 | |
| 9 | 114.7385 | 0.200 | | | |

TABLE 6-continued (6-1)

| Surface NO. | r | d | Nd | vd | ΔPgf |
|---|---|---|---|---|---|
| 10 | 48.0249 | 1.280 | 1.71736 | 29.50 | |
| 11 | 23.1269 | 7.560 | 1.49700 | 81.61 | 0.0375 |
| 12 | −1336.7107 | D12 | | | |
| 13 | 245.1992 | 1.180 | 1.61293 | 37.00 | |
| 14 | 26.1768 | 5.150 | | | |
| 15 | 0.0000 | 4.150 | | | (Aperture stop) |
| 16 | 71.2071 | 2.660 | 1.78066 | 47.84 | |
| 17 | −1862.3061 | 0.540 | | | |
| 18 | 1476.2696 | 0.840 | 1.62004 | 36.30 | |
| 19 | 63.6204 | 5.477 | | | |
| 20 | −26.3232 | 1.000 | 1.71736 | 29.50 | |
| 21 | 88.4941 | 7.233 | 1.91082 | 35.25 | |
| 22 | −38.0813 | 0.200 | | | |
| 23 | 654.2754 | 4.430 | 2.00100 | 29.13 | |
| 24 | −87.5721 | 41.568 | | | |
| 25 | 0.0000 | 2.000 | 1.51680 | 64.20 | |
| 26 | 0.0000 | 1.000 | | | |

(6-2)

| Imaging distance | INF | 790.00 |
|---|---|---|
| D7 | 8.385 | 1.939 |
| D12 | 1.628 | 8.074 |

TABLE 7

| | | Example 1 | Example 2 | Example 3 | Example 4 | Example 5 | Example 6 |
|---|---|---|---|---|---|---|---|
| Expression (1) | Nd1 | 2.001 | 2.001 | 1.954 | 1.954 | 1.954 | 2.001 |
| Expression (2) | Cr1f/f | 0.939 | 0.866 | 0.838 | 0.864 | 0.863 | 0.820 |
| Expression (3) | Cr1r/f | 0.467 | 0.444 | 0.416 | 0.465 | 0.343 | 0.477 |
| Expression (4) | f2/f | 0.688 | 0.695 | 0.802 | 0.723 | 0.798 | 0.577 |
| Expression (5) | Cr2f/f | 0.449 | 0.437 | 0.447 | 0.440 | 0.381 | 0.472 |
| Expression (6) | Cr2f/Cr1r | 3.132 | 3.041 | 4.058 | 2.759 | 3.222 | 3.212 |
| Expression (7) | (R1 + R2)/(R1 − R2) | 1.831 | 2.178 | 1.079 | 1.573 | 0.971 | 2.858 |
| Expression (8) | vd2n | 29.50 | 27.53 | 29.50 | 29.50 | 32.17 | 29.50 |
| Expression (9) | ΔPgF1 | 0.056 | 0.056 | 0.056 | 0.056 | 0.056 | 0.038 |
| Expression (10) | |f1|/f | 8.197 | 6.722 | 4.680 | 5.488 | 3.762 | 34.591 |
| Expression (11) | ΔPgF3 | 0.038 | 0.038 | 0.038 | 0.038 | 0.019 | 0.038 |
| Expression (12) | |(1 − βvc) × βr| | 0.589 | 0.596 | 0.601 | 0.606 | 0.744 | 0.529 |

According to the present invention, it becomes possible to provide small, high-performance, and have large-aperture optical system and image pickup apparatus which are suitable for a small-size imaging system.

What is claimed is:

1. An optical system, comprising, in order from an object side:
    a first lens group;
    a second lens group having positive refractive power; and
    a third lens group having positive refractive power, wherein
    the first lens group and the third lens group are fixed in an optical axis direction while the second lens group is moved in the optical axis direction to focus on from an object at infinity to an object at a finite distance, and the following conditions are satisfied:

$$1.90 < Nd1 \tag{1}$$

$$0 < Cr1f/f \tag{2}$$

where Nd1 represents a refractive index of a lens disposed closest to the object side in the first lens group on a d-line,
Cr1f represents a radius of curvature of a surface closest to the object side in the first lens group, and
f represents a focal length of the entire optical system.

2. The optical system according to claim 1, wherein a surface closest to an image side in the first lens group satisfies a following condition:

$$0 < Cr1r/f \tag{3}$$

where Cr1r represents a radius of curvature of a surface closest to an image side in the first lens group.

3. The optical system according to claim 1, wherein the second lens group satisfies the following condition:

$$0.4 < f2/f < 3.0 \tag{4}$$

where f2 represents a focal length of the second lens group, and
f represents the focal length of the entire optical system.

4. The optical system according to claim 1, wherein a surface closest to the object side in the second lens group satisfies the following condition:

$$0 < Cr2f/f \tag{5}$$

where Cr2f represents a radius of curvature of a surface closest to the object side in the second lens group.

5. The optical system according to claim 1, wherein a surface closest to an image side in the first lens group and a surface closest to the object side in the second lens group satisfy the following condition:

$$0.65 < Cr2f/Cr1r < 2.00 \tag{6}$$

where Cr1r represents a radius of curvature of the surface closest to the image side in the first lens group, and
Cr2f represents a radius of curvature of the surface closest to the object side in the second lenses group.

6. The optical system according to claim 1, wherein the second lens group includes at least one lens having negative refractive power, and
the lens having negative refractive power satisfies the following condition:

$$0.50 < (R1+R2)/(R1-R2) < 5.00 \tag{7}$$

where R1 represents a radius of curvature of an object-side surface of the lens having negative refractive power included in the second lens group, and
R2 represents a radius of curvature of an image-side surface of the lens having negative refractive power included in the second lens group.

7. The optical system according to claim 1, wherein the second lens group includes at least one lens having negative refractive power, and
the lens having negative refractive power included in the second lens group satisfies the following condition:

$$vd2n < 50.0 \tag{8}$$

where vd2$n$ represents an abbe number of the lens having negative refractive power on the d-line.

8. The optical system according to claim 1, wherein the first lens group includes at least one lens having positive refractive power, and the lens having positive refractive power satisfies the following condition:

$$0.009 < \Delta PgF1 \qquad (9)$$

where $\Delta PgF1$ represents a deviation of a partial dispersion ratio of the lens having positive refractive power included in the first lens group from a reference line, the reference line being a straight line passing coordinates of partial dispersion ratio values and vd values of C7, which have a partial dispersion ratio of 0.5393 and vd of 60.49 and F2, which have a partial dispersion ratio of 0.5829 and vd of 36.30.

9. The optical system according to claim 1, wherein the third lens group includes at least one lens having negative refractive power.

10. The optical system according to claim 1, wherein the first lens group satisfies the following condition:

$$2.6 < |f1|/f \qquad (10)$$

where f1 represents a focal length of the first lens group.

11. The optical system according to claim 1, wherein the second lens group includes at least one lens having positive refractive power, and the lens having positive refractive power satisfies the following condition:

$$0.009 < \Delta PgF3 \qquad (11)$$

where $\Delta PgF3$ represents a deviation of a partial dispersion ratio of the lens having positive refractive power included in the second lens group from a reference line, the reference line being a straight line passing coordinates of partial dispersion ratio values and vd values of C7, which have a partial dispersion ratio of 0.5393 and vd of 60.49 and F2, which have a partial dispersion ratio of 0.5829 and vd of 36.30.

12. An image pickup apparatus comprising:
an optical system according to claim 1; and
an image sensor provided on an image side of the optical system for converting an optical image formed by the optical system into an electrical signal.

* * * * *